United States Patent [19]
Stöbe

[11] 3,748,263
[45] July 24, 1973

[54] METHOD OF AND APPARATUS FOR MEASURING THE FILTER CAKE THICKNESS ON FILTER ELEMENTS OF SETTLING TANK FILTERS

[75] Inventor: Lothar Stöbe, Gutenberg, Germany
[73] Assignee: Seitz-Werke G.m.b.H., Bad Kreuznach, Germany
[22] Filed: July 9, 1971
[21] Appl. No.: 161,253

[30] Foreign Application Priority Data
July 10, 1970 Germany.................. P 20 34 308.2

[52] U.S. Cl....................... 210/65, 210/86, 210/94, 210/106
[51] Int. Cl............................................. B01d 37/04
[58] Field of Search .................. 210/65, 79, 86, 89, 210/96, 97, 100, 104, 106, 94

[56] References Cited
UNITED STATES PATENTS
| | | | |
|---|---|---|---|
| 1,299,996 | 4/1919 | Nicholson........................ | 210/86 X |
| 2,204,225 | 6/1940 | Meackel.......................... | 210/96 X |
| 3,204,766 | 9/1965 | Schmidt, Jr........................ | 210/86 |

*Primary Examiner*—John Adee
*Attorney*—Walter Becker

[57] ABSTRACT

A method of measuring the thickness of a filter cake on a filter element of a settling tank filter, according to which a portion of the slurry introduced into the settling tank filter is in a continuous manner withdrawn therefrom in the form of a branched off stream and is passed through passage means in a filter body arranged opposite to and spaced from an adjacent filter element of the settling tank filter by a distance corresponding to the intended maximum thickness of the filter cake to be built up on the adjacent filter element. When the filter cake on the adjacent filter element has grown to its intended maximum thickness, it closes the passage means through the filter body while a filter layer settles on the filter body and filters the slurry of the branched off stream, the thus obtained filtrate being visible through a sight glass or the like and thus indicating to the operator that the filter cakes or the filter elements of the settling tank filter have reached their admissible maximum thickness.

7 Claims, 2 Drawing Figures

METHOD OF AND APPARATUS FOR MEASURING THE FILTER CAKE THICKNESS ON FILTER ELEMENTS OF SETTLING TANK FILTERS

The present invention relates to a method of and apparatus for measuring the filter cake thickness on filter elements of settling tank filters.

For an economical settling filtration in the above mentioned filter apparatus, in addition to other characteristics, also the thickness of the filter cake which adheres to the filter elements is of importance. With a larger cake thickness the efficiency of the deposited layer generally disappears. Moreover, at the input side of the filter the pumping pressure increases. Many liquids cannot stand this increase, and consequently the cake must be removed or reduced to a thickness which they can stand.

In view of the finding that the cake thickness has a material bearing on a favorable filtration and has no universal value but rather an empirical value which is different for every filter material, various approaches were suggested to measure the cake thickness during the filtration process. The known measuring methods predominantly use mechanical means, especially in the form of a longitudinal or rotary movable sensing element or feeler, directed against the cake surface. Such means are adjustable to a specified cake thickness and when they touch the filter cake, they give a signal to interrupt the filtration process.

It is an object of the present invention to provide a method of and apparatus for measuring the thickness of the filter cake adhering to the filter elements and to eliminate the expense of mechanical installations required with heretofore known methods.

It is also an object of the invention to perform the measurement directly during the course of the filtration without action by means engaging the filter cake, thereby eliminating damage to the filter cake, which damage is detrimental to the filtration process proper, as well as eliminating incorrect measurements which are traceable to damage to the cake.

It is a further object of the invention to provide a method of measuring which is practiced by an apparatus inherent to the filtration process proper and not requiring any special technical knowledge to operate.

These and other objects and advantages of the invention will appear more clearly from the following specification in connection with the accompanying drawings, in which.

Figure 1:
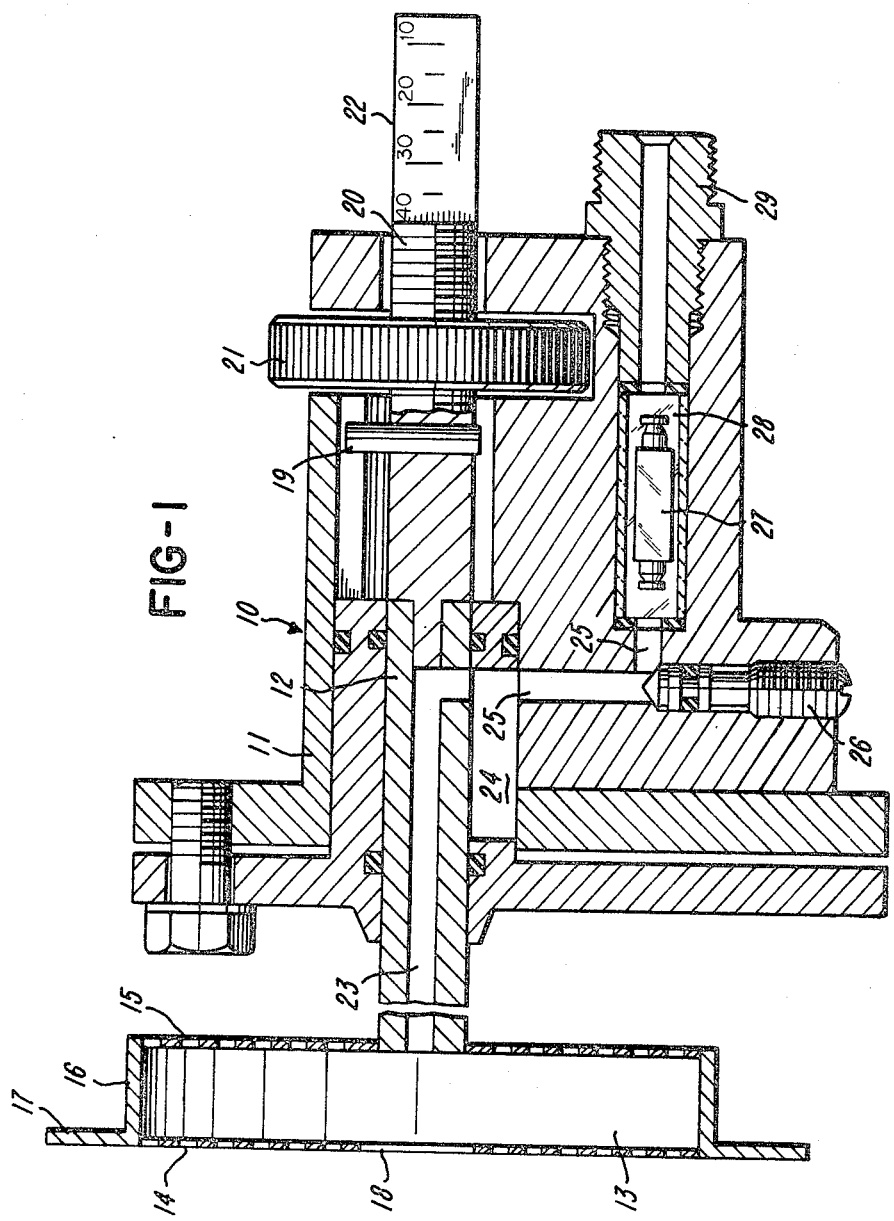
FIG. 1 is a longitudinal section of the device according to the invention.

With the above in mind, the method according to the invention is characterized primarily in that a partial stream of the slurry fed to the filter is continuously conducted to the outside through a filter pad which is arranged opposite to and spaced from a filter element by a distance corresponding to the predetermined or desired cake thickness. The method is furthermore characterized in that after the cake on the filter element has covered the filter pad, a filter layer is deposited thereon, whereby the partial stream is filtered and the filtrate indicates that the predetermined cake thickness has been obtained. To this end, expediently under the effect of the inner pressure of the filter, the partial stream is conveyed outwardly and the filtering layer is deposited on the filter pad. According to a further advantageous development of the method according to the invention, the partial stream is conveyed to a collecting tank which is under atmospheric pressure, for instance the settling tank which precedes the filter. On its way to the collecting tank, the partial stream flows through a conduit section or sightglass for observation and/or measurement of the condition or state of the said partial stream.

The apparatus for practicing the method according to the invention is characterized primarily in that the filter pad forms a hollow body and respectively has as base surfaces a settling web and a supporting web, said supporting web being provided with an opening. The said filter pad is also provided with a liquid-tight mantle interconnecting the said webs. The filter pad has its supporting web, which faces a filter element, connected to that end of a longitudinally adjustable spindle which leads to the interior of the filter. The inner chamber of the filter pad, defined by the mantle and webs, is connected to a liquid conveying conduit which leads outwardly and is provided with an observation and/or measurement station.

According to a preferred embodiment of the invention, the spindle is mounted in a housing which may be secured to the outside of the filter tank, for instance on the tank cover. The spindle is provided with a thread engaged by a nut arranged in the housing for longitudinally moving the spindle. Expediently, that end of the spindle which is opposite the filter pad projects out of the housing and is equipped with a measuring scale adapted to indicate the respective distance of the filter pad from the adjacent filter element. According to a further embodiment of the invention, the spindle forms the inlet end of a liquid conveying conduit which leads outwardly, for instance into the settling tank. To this end, the spindle is provided with an axial bore which is connected to the inner chamber of the filter pad and which leads into a housing chamber designed in conformity with the adjusting stroke of the spindle. From the housing chamber the outwardly leading liquid conveying conduit continues in the form of a housing conduit which latter in its turn is enlarged to form a housing window for observing and/or measuring the partial stream.

Referring now to the drawings in detail, the device 10 shown in FIG. 1 comprises primarily a housing 11, a spindle 12 which extends into the housing 11 and is longitudinally movable therein and the opposite ends of which extend beyond the forward and rearward housing walls, and a filter pad 13 which is secured to the forward end of the spindle 12.

The filter pad 13 forms a hollow body with a round or angular cross section; on one base surface it has a supporting web 14 provided with a central opening 18 and on the other base surface it has a continuous settling web 15. A liquid-tight mantle 16 interconnects the webs 14 and 15 arranged in parallel spaced relationship to each other. Within the range of the web 14 the mantle 16 has an outwardly projecting extension 17.

The spindle 12, journalled in the housing 11, is provided with a thread 20 which engages a knurled nut 21 inserted in the housing 11. The spindle 12, which is longitudinally adjustable by means of the screw connection 20, 21, is prevented from turning by a pin 19. In addition thereto, the rear end of the spindle 12, which projects from the housing 11 and expediently has a flat surface, is equipped with a measuring scale 22. The opposite forward end of the spindle 12 simultaneously forms the inlet side of a fluid conduit which passes from the filter pad 13 to the outside and to this end has an axial bore 23 which is connected to the inside of the filter pad 13 opposite the opening 18. The bore 23 leads into a housing area 24 designed in conformity with the adjustment range of the spindle 12, from which at a right angle housing conduit 25 extends into the atmosphere. A screw 26 projects into the conduit 25 to throttle the through-flow through the passage. Expediently, the screw begins to act at the vertex of the conduit bend and thereby allows the cleaning of the chamber 24 as well as of the conduit 25. Adjacent to the throttling screw 26, the conduit 25 is enlarged to a housing window 28 which may be lighted by a lamp 27. A connecting piece 29 is situated on the housing 11 for receiving a conduit and connecting same to the conduit 25.

Figure 2:
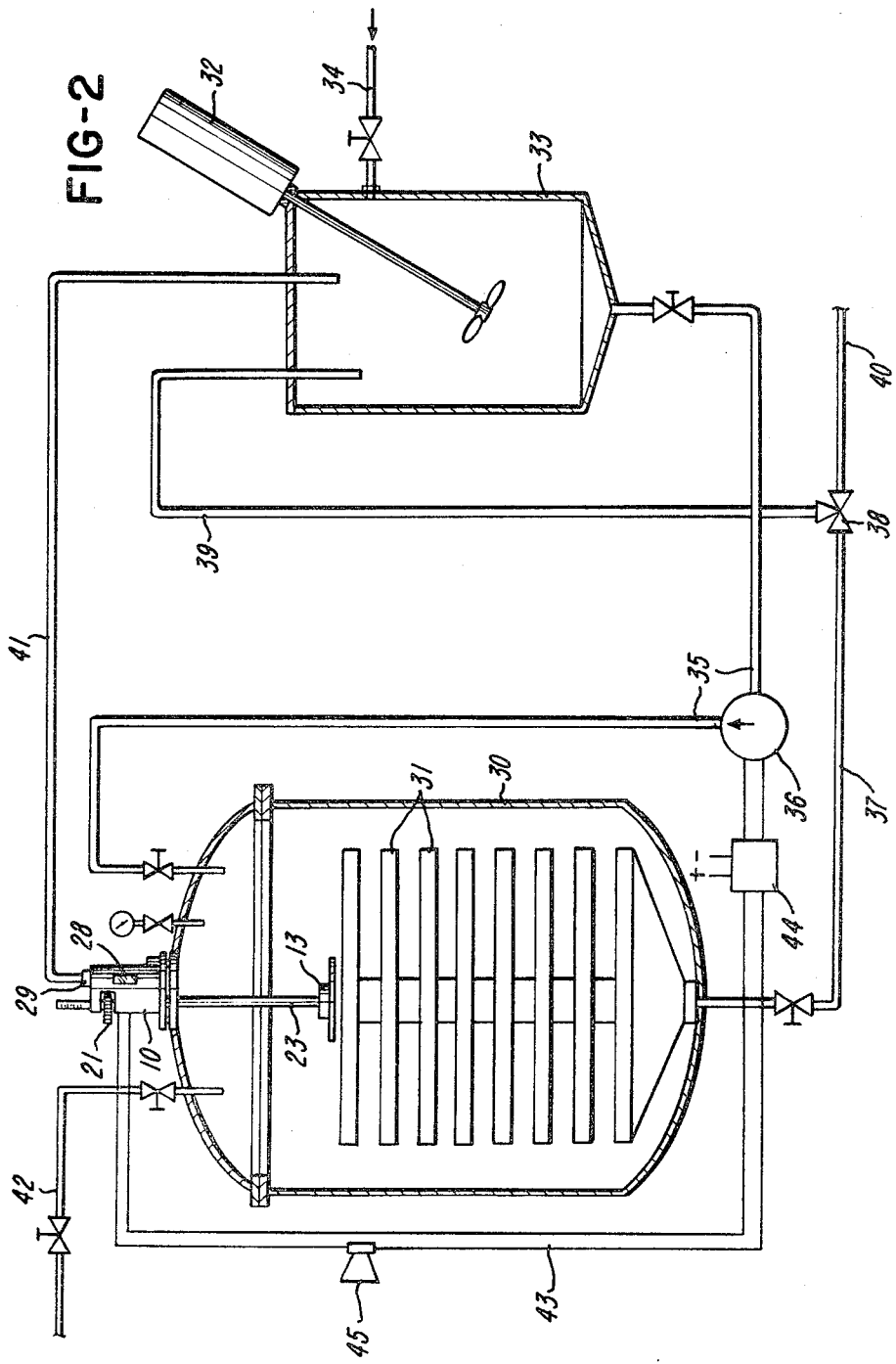
FIG. 2 shows the device according to the invention mounted on a vertical settling tank filter.

The vertical settling tank filter 30 diagrammatically shown in FIG. 2 serves to illustrate the measuring method in connection with the device according to the invention. The settling tank filter 30 is provided with several filter elements 31 which are combined into a packet and has a settling tank 33 which precedes the filter 30 and is equipped with an agitator 32. Said settling tank 33 is adapted to receive auxiliary filter means. From the tank 33, which is connected to a feed line 34 for slurry and which is under atmospheric pressure, a conduit 35 with a pump 36 interposed therein passes to the inlet side of the filter 30. A further conduit 37 connected to the filter exit extends to a three-way valve 38, where it branches into a conduit 39, which empties into the tank 33 and a conduit 40, which passes to a processing or storage station, not pictured in the drawings, for the filtrate. A conduit 41 which also empties into the tank 33 is connected to the connecting piece 29 of the device 10, which device is mounted on the cover of the filter 30 and is expediently connected thereto by a flanged coupling. The device 10 has its filter pad 13 extending into the interior of the filter 30 and is located opposite the upper filter element 31 of the packet.

Conduit 42 passes pressurized gas or water into the filter 30, and the electric circuit 43 passes to the pump 36 from an electric turbidimeter situated on the housing window 24 but not illustrated in the drawing. The electric circuit 43 comprises a switch 44 which controls the pump 36 and turns on a visible or audible signaling device 45.

At the start of the filtration process, the filter pad 13, which is within the tank 30, is adjusted by means of the nut 21 to the predetermined cake thickness, which is readable from the scale 22. The adjustment is effected so that the supporting web 14 is opposite the filter element 31, and is arranged in parallel spaced relationship thereto, the spacing being selected in conformity with the desired cake thickness. During the subsequent settling process the pump 36 feeds slurry containing auxiliary filter means from the tank 33 through the conduit 35 into the filter 30. A part of the said slurry returns to the tank 33 through conduit 37, valve 38, and conduit 39. The pump circulation of slurry is ended as soon as the filter elements 31 have a settling layer of sufficient thickness. During the settling process, the slurry also flows in a partial stream through the filter pad 13, the spindle bore 23, the housing conduit 25 and the conduit 41 into the tank 33. The opening 18 in the supporting web 14 prevents a settling layer from forming on both webs 14, 15.

During the now starting filtration process, the pump 36 feeds the slurry from the tank 33, which is continuously supplied by the conduit 34, through the conduit 35 into the pressurized filter 30. It is to be understood that auxiliary filter means may also be added to the slurry. Under the influence of the pressure differential between the filter inner pressure and the outside pressure, the filtrate subsequently flows off through the conduit 37, the reversed valve 38, and the conduit 40. At the same time a partial stream of the slurry flows out of the filter 30 through the filter pad 13, the spindle bore 23, the housing conduit 25, and the conduit 41 back into the tank 33, which is at atmospheric pressure. When, during the course of the filtration process, settled filter cakes build up on the elements 31 to the predetermined thickness, the cake on the element 31 nearest the filter pad 13 covers the supporting web 14 of the filter pad 13. The opening 18 is thereby closed, so that the partial stream of the slurry is now conducted by the extension 17 to the rearward settling web 15 through which it enters the filter pad 13 and from which it flows through the conduits 23, 25, and 41 into the tank 33. As a result thereof a layer of auxiliary filter means settles on the web 15, which layer at an adequate thickness filters the partial stream. When the filtrate becomes visible in the housing window 28 the operator knows that the predetermined cake thickness has been obtained and that the filtration must be interrupted. When employing automatic operation, the turbidimeter arranged on the housing window 28 registers the filtrate flowing off in the partial stream and shuts off the pump 36 by the switch 44, in which instance the signaling device 45 is set off.

It is of great advantage that the device 10 may be used during the running of the filtration process as well as when it is interrupted to measure the thickness of the cake already existing on the filter elements 31. To this end the spindle 12 is adjusted horizontally by turning the nut 21 until the web 14 of the filter pad 13 engages the upper surface of the cake adhering to the upper element 31. In both instances the actual cake thickness is then readable on the scale 22 on the rearward end of the spindle 12. During the actual filtration process, the engagement of the filter pad 13 with the cake of the element 31 is additionally indicated when, as a result of the web 14 and the opening 18 being covered, the partial stream immediately flows off through the web 15 as filtrate. By resetting the filter pad 13 to the predetermined cake thickness the opening 18 in the web 14 is again freed so that the partial stream is again withdrawn as slurry.

It is, of course, to be understood that the present invention is by no means limited to the specific showing in the drawings but also comprises any modifications within the scope of the appended claims.

What I claim is:

1. A method of measuring the thickness of filter cakes being built up on filter element means of a settling tank filter, which includes the steps of: in a continuous flow feeding a slurry to be filtered into and through a settling tank filter with filter element means on which filter cakes are being formed, continuously withdrawing a portion of the slurry in said settling tank filter and passing said portion in the form of a branched off stream through a free passage in a filter body while locating said filter body in the vicinity of and spaced from one of said filter element means by a distance substantially equalling the intended maximum thickness of the filter cakes being formed on said one filter element means, in response to the filter cake on the said one filter element means obtaining its intended maximum thickness closing said free passage to thereby cause said branched off stream to build up a filtering layer on said filter body and causing said last mentioned filtering layer to filter said stream passed through said filter body, and making the thus obtained filtrate of said stream visible for checking by an operator.

2. A method according to claim 1, which includes the step of pressurizing the slurry in said settling tank filter for causing said branched off stream to pass through said filter 3. A method according to claim 1, which includes the step of conveying the filtrate of said branched off stream after having passed through said filter body to a collecting tank under atmospheric pressure while exposing said filtrate prior to reaching said collecting tank to observation and testing.

4. In combination with a settling tank filter having superimposed vertically spaced filter element means with filter cakes respectively being formed thereon, a filter body for detecting build-up of filter cake which includes: filter pad means forming a hollow body and respectively having as base surfaces settling web means and supporting web means arranged opposite and in spaced relationship to each other, liquid-tight mantle means interconnecting said settling web means and said supporting web means, said supporting web means having an opening therethrough and facing one of said filter element means, housing means, spindle means longitudinally displaceably mounted in said housing means and extending into said filter pad means, an end portion of said spindle means which extends into said filter pad means being connected thereto for adjustment of said filter pad means, and conduit means communicating with the interior of said filter pad means and leading out of said filter pad means for permitting checking of the liquid passed through said filter pad means.

5. An arrangement according to claim 4, in which said housing means is connected to the outside of said settling tank filter, and in which said spindle means has a threaded section and is prevented from rotation, rotatable nut means axially substantially non-movably mounted in said housing means and threadedly engaging said threaded spindle section for axially displacing said spindle means and thereby said filter pad means in response to a rotary movement of said nut means.

6. An arrangement according to claim 4, in which that end portion of said spindle means which is remote from said filter pad means projects from said housing means and is provided with a scale for indicating the spacing of said filter pad means from the adjacent filter element means.

7. An arrangement according to claim 4, in which said conduit means is partially located in and extends in axial direction of said spindle means and is partially provided in said housing means, that portion of said conduit means which is located in said housing means including window means for checking the liquid passing through said conduit means.

* * * * *